Patented Aug. 3, 1943

2,325,737

UNITED STATES PATENT OFFICE 2,325,737

RUBBER COMPOUNDING

Clyde H. Boys, Drexel Hill, Pa., assignor to Hercules Powder Company, Wilmington, Del., a corporation of Delaware No Drawing. Application June 15, 1940,
Serial No. 340,638

3 Claims. (Cl. 260—755)

This invention relates to the art of rubber compounding, and more particularly to an improved rubber composition.

Heretofore, various types of materials have been used as softeners, plasticizers, or tack producers for rubber compounds. For example, materials such as rosin, cumar resin, para-coumarone resin, pine tar, stearic acid, salts of lauric acid, waxes, pitches; animal, mineral, and vegetable oils; and blends of two or more of these materials have been used. While these materials are suitable as softeners, they are not entirely satisfactory in all instances because they adversely affect the rate of cure or vulcanization, tensile strength, resistance to blooming (loss of tack), aging properties, or ease of milling of the rubber compositions in which they are used.

An object of the present invention is to provide an improved rubber composition which is not subject to the foregoing disadvantages.

Another object is to provide a new and improved softener, plasticizer, and tack producer for rubber.

Another object is to utilize a material which activates the accelerators used in rubber compounding, and thereby further increases the rate of vulcanization.

A further object is to provide a softener and tack producer for rubber which in addition activates the accelerators used in rubber compounding.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, these objects are attained by using hydrogenated rosin as a softener or plasticizer and tack producer for rubber. The hydrogenated rosin may be incorporated in the rubber during the preparation of the rubber stock, either alone or in conjunction with other suitable softeners.

The rubber stock, by which is meant the mixture of rubber compounding materials prior to vulcanization, generally, in addition to the softener, comprises a major proportion of rubber and a filler or mixture of fillers, and minor proportions of vulcanizing agents, accelerators and anti-oxidants.

The hydrogenated rosin which may be used in the preparation of rubber compositions is the product which is obtained by hydrogenating rosin as such, which consists chiefly of abietic, pimaric, sapinic, or like rosin acids or mixtures thereof, under conditions suitable to achieve saturation of at least 50% of the available two double bonds of the rosin acid radicals present. The term "hydrogenated rosin," as used herein and in the claims, includes similarly hydrogenated products obtained from any of the group of rosin acids in substantially pure form. The hydrogenated rosin may be prepared, for example, by contacting fluid, refined rosin with hydrogen in the presence of an activated nickel catalyst and a pressure of about 200 to 500 pounds per square inch at a temperature of about 125° C. to about 226° C. for 1 to 2 hours, or other suitable methods may be employed.

Any suitable kinds of rubber, rubber-like materials or rubber substitutes may be utilized in preparing the rubber stock; however, in most cases, crepe rubber is preferred.

The fillers which may be employed are, for example, aluminum flake, antimony sulfide, asbestine, asbestos, barium sulfate, Bentonite, cadmium sulfide, carbon black, chromic oxide, clay, cotton linters, iron oxide, quick lime, slaked lime, litharge, lithopone, magnesium carbonate, magnesium oxide, mica, silica, slate flour, talc, titanium dioxide, ultramarine, vermilion, whiting, zinc oxide, or zinc sulfide. Preferably a mixture of these fillers is utilized to give the rubber the desirable color and other properties. For example, rubber compositions may contain carbon black and zinc oxide as filling ingredients.

As a vulcanizing agent, sulfur is preferred, although in some cases selenium or tellurium may be desirable and may be used in conjunction with sulfur.

The accelerators which are suitable for reducing the time required for vulcanization and/or to enable vulcanization to be effected at lower temperatures, are, for example, diphenylamine, di-o-tolylguanidine, diphenylguanidine, ethylidene aniline, hexamethylene tetramine, mercaptobenzthiazole, methylene aniline, tetramethylthiuram disulfide, tetramethylthiuram monosulfide, triethyltrimethylenetriamine, thiocarbanilide, or triphenylguanidine.

If anti-oxidants are desired, materials such as, aldol-a-naphthylamine, diphenylethylenediamine, di-o-tolylethylenediamine, phenyl-B-naphthylamine, or phenyl-a-naphthylamine may be used.

Since the hydrogenated rosin may be used as a softener for a great number of well known rubber stock compositions comprising rubber, fillers, vulcanizing agents, accelerators, and antioxidants, a typical rubber stock formula adapted for rubber tires will serve to illustrate the invention. Such a formula may comprise:

| | Parts |
|---|---|
| Crepe rubber | 100 |
| Zinc oxide | 5 |
| Carbon black | 50 |
| Hydrogenated rosin | 1–3 |
| Sulfur | 3 |
| Diphenylamine | 1 |
| Diphenylguanidine | .87 |

If desired, a blend of softener comprising 1 part hydrogenated rosin and 2 parts stearic acid may be used instead of hydrogenated rosin alone.

The rubber stock according to the foregoing formula was compounded by milling 100 g. of crepe rubber until it was worked up into a homogeneous mass and was then thrown on suitable milling rolls. The zinc oxide, carbon black, hydrogenated rosin (and stearic acid if desired), and sulfur were added in the order named and milling was continued until the rubber was uniform in appearance and of the desired consistency, which required between 20 to 30 minutes of milling. The diphenylamine and diphenylguanidine which serve as accelerators were added during the latter steps of the milling operation. The hydrogenated rosin showed excellent effects of softening the rubber, and in aiding the milling of the stock.

The mixture of rubber stock was then removed from the rolls and was molded into a cup-shaped member by applying pressure at a temperature of about 140° C. which was maintained for about 20 minutes to cure or vulcanize the stock. The hydrogenated rosin exhibited a tendency to activate the accelerators, whereby the curing rate of the stock was increased in comparison with the curing rate of rubber stocks containing paracoumarone resin, stearic acid, or a blend of 3% stearic acid 4% pine tar as softeners. The finished vulcanized rubber composition also exhibited good original tensile strength and appeared to have good aging properties.

From the foregoing description, it will be seen that the present invention provides an improved rubber composition having very desirable characteristics. By using hydrogenated rosin as a softener plasticizer and tack producer, the accelerators were activated, which increased the rate of curing or vulcanization. The rubber composition is suitable for many uses, for example, rubber tires or other rubber articles where good wearing characteristics, retention of resilience, and tensile strength are essential.

It will be understood that the details and examples hereinbefore set forth are illustrative only and that the invention as herein broadly described and claimed is in no way limited thereby.

What I claim and desire to protect by Letters Patent is:

1. A vulcanized product of a composition comprising rubber, an accelerator, and from about 1% to about 3% hydrogenated rosin based on the weight of the rubber employed, the hydrogenated rosin acting as an activator for the accelerator.

2. A vulcanized product of a composition comprising rubber, a guanidine accelerator, and from about 1% to about 3% of hydrogenated rosin based on the weight of the rubber employed, the hydrogenated rosin acting as an activator for the guanidine accelerator.

3. A vulcanized product of a composition comprising rubber, an accelerator, from about 1% to about 3% hydrogenated rosin based on the weight of the rubber employed, the hydrogenated rosin acting as an activator for the accelerator, sulfur, and carbon black.

CLYDE H. BOYS.